June 15, 1937. M. J. REID 2,083,667
RECOVERY OF A MIXED ORGANIC ACID ESTER OF CELLULOSE
FROM ITS MIXTURE WITH NITROCELLULOSE
Filed May 5, 1934
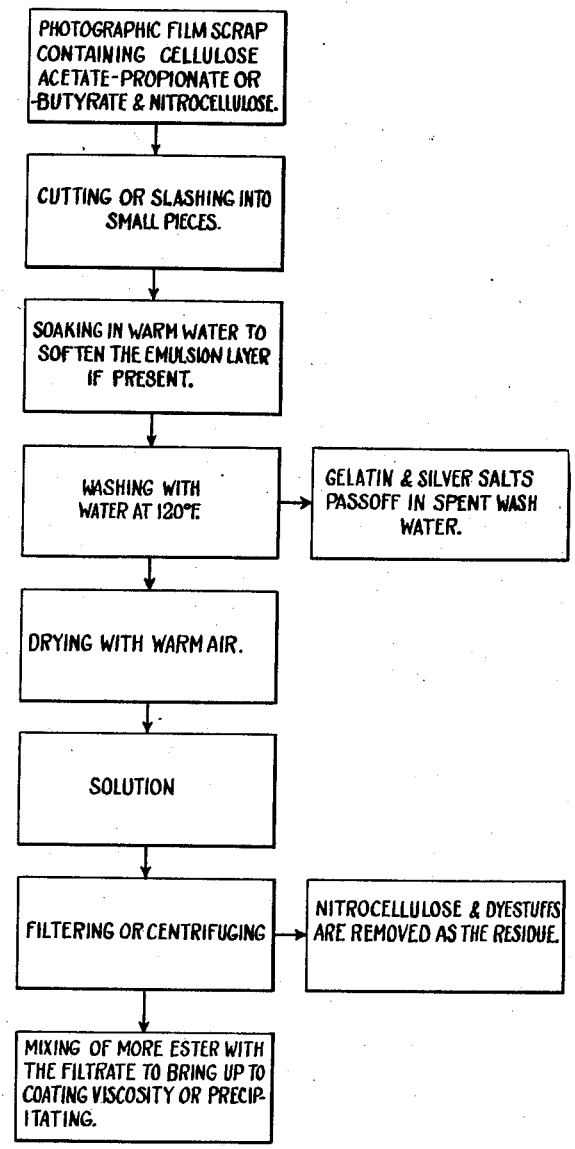
Inventor:
M. Jerome Reid, Patented June 15, 1937

2,083,667

UNITED STATES PATENT OFFICE 2,083,667

RECOVERY OF A MIXED ORGANIC ACID ESTER OF CELLULOSE FROM ITS MIXTURE WITH NITROCELLULOSE

Marvin J. Reid, Rochester, N. Y., assignor, by mesne assignments, to Eastman Kodak Company, Jersey City, N. J., a corporation of New Jersey Application May 5, 1934, Serial No. 724,201

17 Claims. (Cl. 260—102)

The present invention relates to the recovery of a cellulose ester containing propionyl and/or butyryl radicals from its mixtures with nitrocellulose, as for example scrap photographic film, by dissolving it out by means of an alkylene chloride or a similar solvent.

Although this invention is directed to the separation of a cellulose ester containing propionyl and/or butyryl radicals such as cellulose acetate-propionate or -butyrate from nitrocellulose in any case where they are mixed and their separation is desirable, however, it is particularly directed to the recovery of the cellulose ester containing propionyl and/or butyryl from scrap photographic film such as where the nitrocellulose has been employed as a coating on the film base composed of the mixed ester.

In my copending application Serial No. 612850, filed May 21, 1932, I have described and claimed a method of removing plasticizer from cellulose acetate film scrap by leaching with ethyl or methyl alcohol in which process some of the nitrocellulose is also removed from the cellulose acetate. The regular treatment disclosed in that application comprises the steps of bleaching the film scrap in an aqueous solution of sodium and calcium hypochlorite followed by the leaching treatment. While this method is very satisfactory for the removal of plasticizer from cellulose acetate, it is not concerned with the complete removal of the nitrocellulose present therein. In the case of cellulose acetate, the presence of a small amount of nitrocellulose is not entirely objectionable as it readily dissolves in the acetone which is employed as the solvent for the cellulose acetate. Due to the fact that cellulose nitrate is not soluble in ethylene chloride which is the solvent commonly employed in the forming of film from cellulose acetate propionate, the presence of small amounts of cellulose nitrate therein is objectionable. Therefore the above described process would not be practical for the recovery of film scrap or the like comprising cellulose esters such as cellulose acetate-propionate or -butyrate especially where ethylene chloride is to be employed as the solvent for the formation of film therefrom.

The use of mono-ethyl ether of ethylene glycol as the solvent in a similar process for the separation of cellulose nitrate from cellulose acetate which is described and claimed in my copending application, Serial No. 743,612, filed Sept. 11, 1934 is a very effective method for separating those esters from each other in a mass in which they are associated. This process might also be employed for the separation of cellulose acetate-propionate (or acetate-butyrate) from nitrocellulose for which purpose it is quite suitable, however, due to the cost of the mono-ethyl ether of ethylene glycol employed the cost of recovery there is comparatively high.

One possible explanation is that due to the fine grain of a film of cellulose acetate-propionate (or acetate butyrate) that when a nitrocellulose overcoating is applied thereto, it penetrates the microscopically small interstices of the mixed ester film on which it forms a layer. If one of the common solvents of nitrocellulose such as methyl alcohol is used to dissolve off this layer, the separation is incomplete due to the failure of the solvent to dissolve out the nitrocellulose most intimately associated with the mixed ester. Mono-ethyl ether of ethylene glycol does have the advantage that it will dissolve the nitrocellulose from the interstices, however, if the use of one of the commoner solvents is desired I have found that the use of a solvent which will dissolve away the cellulose acetate propionate (or acetate butyrate) is desirable for the accomplishment of a successful separation.

One object of my invention is to provide a process of substantially completely separating nitrocellulose from cellulose esters containing propionyl and/or butyryl groups. Another object of my invention is to recover these esters in such a form that they can be employed directly, after making up to the proper viscosity, for coating out into sheeting or film. A further object of my invention is to provide a process particularly adapted for the recovery of these esters of cellulose from scrap photographic film, especially that containing anti-halation coloring and plasticizers. A still further object of my invention is to provide a process of recovering a cellulose ester containing propionyl and/or butyryl groups from its mixture with nitrocellulose for instance from photographic film at a minimum cost. A still further object of my invention is to provide a process which makes possible the direct utilization of the plasticizer which was employed in the organic acid ester of cellulose originally. Other objects will appear herein.

My invention comprises the treatment of a mixture of the cellulose ester containing propionyl and/or butyryl groups and nitrocellulose with a solvent for the organic acid ester and a non-solvent for the nitrocellulose subsequent to the refining thereof to remove any interfering material therefrom. After solution of the organic acid ester has taken place the mass is centrifuged, whereupon that ester is recovered in solution in the solvent and the nitrocellulose forms the residue.

The following example illustrates a process which involves my invention:

A mass of scrap photographic film comprising acetate-propionate as the film base, nitrocellulose as a layer thereover, a sensitized gelatine emulsion (unexposed, exposed or exposed and developed) and on the back of the film a colored anti-halation layer (unaltered or merely residual) is thoroughly wetted and is cut into pieces small enough to be easily handled. Where the scrap is already in a divided condition, as the punchings resulting from the perforation of motion picture film, such cutting is unnecessary.

Where the particles of the scrap are the desired size, they are immersed in lukewarm water and allowed to soak for several days to soften the gelatine layer. They are then placed in a container in which they are agitated in the presence of water at 100–140° F. The water is changed several times or until the gelatine emulsion containing the silver is completely removed from the film. For instance if the mass has been well soaked 2 or 3 hours, washing is sufficient. If the gelatin has been hardened 5 or 6 hours washing is preferable. The mass is then dried, however, due to the danger from static in handling "bone dry" material of this nature, it is preferable that the drying only be carried to a point where there is still 3–10% and preferably 5–6% of moisture present in the scrap. This drying may be accomplished by passing a current of warm air through the particles, the air preferably being at a temperature of 100–130° F. In order that the drying shall not be too thorough it is desirable that the humidity be controlled. As a rule, however, the humidity of the air is such that after the scrap is dried it will absorb enough moisture from the air to assure the presence of sufficient moisture therein.

The dried scrap containing cellulose acetate-propionate, plasticizer, nitrocellulose and dye is treated with ethylene chloride for such a time that the solution of the acetate-propionate thereby is assured. The preferred ratio is 10 parts of solvent to one of scrap. However, more viscous solutions, such as having a ratio of 5 : 1 might be employed especially if the solution is warmed during the separation. Obviously a greater ratio of solvent to scrap than 10 : 1 might be employed, however, unless the 10 : 1 solution is quite viscous further dilution is unnecessary. The solution contains the cellulose acetate-propionate and the plasticizer, while the nitrocellulose and the coloring material merely remain suspended in the mass.

The separation of the solution from the undissolved matter is then accomplished by means of a super centrifuge. The device employed in this specific example may be described as comprising a rotating cylinder approximately 4 inches in diameter and 30 inches long into which the mixture of the nitrocellulose and the solution of mixed ester containing undissolved nitrocellulose and possibly other materials such as dye, is introduced at the bottom and from which the solution, freed of the undissolved material, is withdrawn at the top. The cylinder is preferably operated at a speed of 14,000 revolutions per minute for this separation. Although it is to be understood that this speed may be varied in accordance with the judgment of the individual operator. The nitrocellulose impurities with which the dye is associated have a greater specific gravity than the solution of the cellulose acetate-propionate and are thrown to the outside wall of the centrifuge bowl and retained there while the clear solution or dope of cellulose acetate-propionate and plasticizer is withdrawn at the top and may be made up to proper condition for coating by the addition of more cellulose acetate-propionate and plasticizer. In the proportions employed (10:1) the separation may be effected by this means at the rate of about 200 gal. per hr. If the solution is more viscous the rate of flow of the solution into the centrifuge will be decreased. For instance a solution made up to 7½:1 may be satisfactorily centrifuged at 150 gal. per hr. while a dope made up in the proportions employed in coating (5:1) cannot be satisfactorily run through at a rate of more than 50 gal. per hr. The viscosity of the solution will depend to some extent on the relative proportions of the cellulose acetate-propionate and nitrate present in the particular scrap material present and the proportion of solvent to solid should be adjusted accordingly.

Other methods of separation may be employed, however, in those methods in which the residue is removed by passing the solution through a membrane, the tendency would be for the nitrocellulose to clog the membrane after filtering for a short time.

When the waste material to be recovered contains a cellulose ester containing propionyl and/or butyryl groups and nitrocellulose but does not contain materials which will interfere with the carrying out of the process, the preliminary soaking and washing step is unnecessary. In that case it is also less necessary that the scrap be cut up into small pieces although such cutting does make for convenience in the carrying out of the process.

Although the process is illustrated with reference to the use of ethylene chloride as the solvent, it is to be understood that other liquids, such as methylene chloride, mixtures of methylene chloride, ethylene chloride or propylene chloride with a small amount of ethyl or methyl alcohol (for instance propylene chloride-methyl (or ethyl) alcohol in the rate of 4:1) tetrachlorethane, 1:4 dioxan, ethylene chlorhydrin, cyclohexanol and chloroform are suitable for use in processes in accordance with my invention. If desired two or more of the alkylene chlorides may be mixed to form a solvent for use in the present invention. It is to be understood that there may be limitations to the value of some of these in this connection, so that not all these solvents might be useful in all cases. For example, as a rule chloroform or tetrachlorethane would not be suitable for separating a cellulose acetate-propionate, which had been hydrolyzed appreciably, from nitrocellulose due to the insolubility of that particular class of cellulose acetate-propionates in those solvents.

Also in the case of the solvents consisting of an alkylene chloride and an alcohol, it must be kept in mind that nitrocellulose is as a rule somewhat soluble in methyl or ethyl alcohol so that the proportion of alcohol to the ethylene chloride should be kept low. It is to be understood that the alcohol content of the solvent may be varied according to the nitrogen content of the nitrocellulose which is to be removed.

A particular advantage of the present process is that the plasticizer originally employed in the organic ester may be reused without the necessity of separating it out. Another advantage is that the dye which may be present is removed along with the nitrocellulose in the separation step. Thus the solution of the mixed ester obtained in the present invention is readily adaptable to the coating or film-forming step either by evaporating off some of the solvent to bring the solution to the proper coating viscosity or preferably by adding more ester and plasticizer to the solution to produce the proper consistency therein for coating.

The present invention is applicable to the recovery from its mixture with nitrocellulose of either simple cellulose esters containing propionyl or butyryl groups such as cellulose propionate and cellulose butyrate or the mixed esters of cellulose containing propionyl and/or butyryl groups such as cellulose acetate propionate, cellulose acetate butyrate, cellulose propionate butyrate and cellulose acetate propionate butyrate.

I claim as my invention:

1. The method of recovering a mixed ester of cellulose containing acetyl groups and acyl groups of 3—4 carbon atoms from its mixture with nitrocellulose which comprises treating the mixture with a liquid, comprising an alkylene chloride, which is a solvent for the mixed ester and a non-solvent for the nitrocellulose and then removing the nitrocellulose therefrom.

2. The method of recovering a mixed ester of cellulose containing acetyl groups and acyl groups of 3—4 carbon atoms from its mixture with nitrocellulose which comprises treating the mixture with a liquid, comprising ethylene chloride, which is a solvent for the mixed ester and a non-solvent for the nitrocellulose and then removing the nitrocellulose therefrom.

3. The method of recovering a mixed ester of cellulose containing acetyl groups and acyl groups of 3—4 carbon atoms from its mixture with nitrocellulose which comprises treating the mixture with a liquid, comprising methylene chloride, which is a solvent for the mixed ester and a non-solvent for the nitrocellulose and then removing the nitrocellulose therefrom.

4. The method of recovering a mixed ester of cellulose containing acetyl groups and acyl groups of 3—4 carbon atoms from a photographic film scrap containing it as well as nitrocellulose which comprises treating the mixture with a liquid, comprising an alkylene chloride, which is a solvent for the mixed ester and a non-solvent for the nitrocellulose and then removing the nitrocellulose therefrom.

5. The method of recovering a mixed ester of cellulose containing acetyl groups and acyl groups of 3—4 carbon atoms from a photographic film scrap containing it as well as nitrocellulose which comprises treating the mixture with a liquid, comprising ethylene chloride, which is a solvent for the mixed ester and a non-solvent for the nitrocellulose and then removing the nitrocellulose therefrom.

6. The method of recovering cellulose acetate-propionate from its mixture with nitrocellulose which comprises treating the mixture with a liquid, comprising an alkylene chloride, which is a solvent for the cellulose acetate propionate and a non-solvent for the nitrocellulose and then separating the nitrocellulose therefrom.

7. The method of recovering cellulose acetate-propionate from its mixture with nitrocellulose which comprises treating the mixture with a liquid, comprising ethylene chloride, which is a solvent for the cellulose acetate-propionate and a non-solvent for the nitrocellulose and then separating the nitrocellulose therefrom.

8. The method of recovering cellulose acetate-propionate from its mixture with nitrocellulose which comprises treating the mixture with a liquid, comprising methylene chloride, which is a solvent for the cellulose acetate-propionate and a non-solvent for the nitrocellulose and then separating the nitrocellulose therefrom.

9. The method of recovering a mixed ester of cellulose containing acetyl groups and acyl groups of 3—4 carbon atoms from its mixture with nitrocellulose which comprises treating the mixture with a liquid comprising a mixture of an alkylene chloride and a lower aliphatic alcohol in insufficient amount to render the alkylene chloride solvent of the nitrocellulose which mixture is a solvent for the mixed ester and then removing the nitrocellulose therefrom.

10. The method of recovering a mixed ester of cellulose containing acetyl groups and acyl groups of 3—4 carbon atoms from its mixture with nitrocellulose which comprises treating the mixture with a liquid comprising a mixture of propylene chloride and a lower aliphatic alcohol in insufficient amount to render the propylene chloride solvent of the nitrocellulose which mixture is a solvent for the mixed ester and then removing the nitrocellulose therefrom.

11. A method of recovering a mixed ester of cellulose containing acetyl groups and acyl groups of 3—4 carbon atoms from its mixture with nitrocellulose which comprises treating the mixture with a liquid comprising propylene chloride-methyl alcohol the alcohol being present in insufficient amount to render the propylene chloride solvent of the nitrocellulose which mixture is a solvent for the mixed ester and then removing the nitrocellulose therefrom.

12. A method of recovering cellulose acetate-propionate from film scrap comprising a mixture of it and nitrocellulose which comprises subdividing the scrap, treating with warm water to remove the gelatine layers therefrom, drying, treating with ethylene chloride to dissolve the cellulose acetate-propionate and any plasticizer which may be present therein and then removing the nitrocellulose and other insoluble impurities therefrom.

13. A method of reclaiming the waste from the manufacture of motion picture film having a base of cellulose acetate-propionate and at least one layer of nitrocellulose thereon which comprises treating the waste, such as the punchings from the perforation thereof in its manufacture, with warm water to remove the gelatin layers therefrom, drying, treating with ethylene chloride to dissolve the cellulose acetate-propionate, removing the nitrocellulose and other insoluble impurities therefrom and, after bringing the solution of the cellulose acetate-propionate to the proper coating viscosity, coating out that solution to form a sheet or film of the cellulose acetate-propionate.

14. The method of recovering an organic acid ester of cellulose containing acyl groups of 3—4 carbon atoms from its mixture with nitrocellulose which comprises dissolving that ester in a solvent liquid comprising an alkylene chloride, said solvent liquid being a non-solvent for the nitrocellulose, and then removing the nitrocellulose therefrom.

15. The method of recovering an organic acid ester of cellulose containing acyl groups of 3—4 carbon atoms from its mixture with nitrocellulose which comprises dissolving that ester in a solvent liquid comprising ethylene chloride, said solvent liquid being a non-solvent for the nitrocellulose, and then removing the nitrocellulose therefrom.

16. The method of recovering a mixed ester of cellulose containing acetyl groups and acyl groups of 3—4 carbon atoms from its mixture with nitrocellulose which comprises treating the mixture with liquid containing only one alkylene chloride, which is a solvent for the mixed ester and then removing the nitrocellulose therefrom.

17. A method of recovering a mixed ester of cellulose containing acetyl groups and acyl groups of 3—4 carbon atoms from its mixture with nitrocellulose which comprises treating the mixture with a liquid, comprising a mixture of ethylene chloride and a lower aliphatic alcohol in insufficient amount to render the ethylene chloride solvent of the nitrocellulose, which mixture is a solvent for the mixed ester and then removing the nitrocellulose therefrom.

MARVIN J. REID.